Oct. 17, 1967

C. G. COURNEYA ETAL 3,347,269

SECTIONAL SPOOL LINEAR VALVE

Filed June 9, 1964

INVENTORS
JERRY W. TODD
CALICE G. COURNEYA
By Carpenter, Abbott, Coulter & Kinney
ATTORNEYS

United States Patent Office 3,347,269
Patented Oct. 17, 1967

3,347,269
SECTIONAL SPOOL LINEAR VALVE
Calice G. Courneya, St. Paul, and Jerry W. Todd, White Bear Lake, Minn., assignors to Minnesota Mining and Manufacturing Company, St. Paul, Minn., a corporation of Delaware
Filed June 9, 1964, Ser. No. 373,623
3 Claims. (Cl. 137—625.48)

ABSTRACT OF THE DISCLOSURE

For use in a multiport, linear-type chromatographic valve, and in combination therewith, an improved plunger for simultaneously connecting various flow paths within the valve by means of flexible, tubular sealing members mounted on the plunger and being capable of radial expansion upon the application of longitudinally directed compressive force to the seals so as to effect a gas-tight sealing between the tubular seals and the valve chamber. The flexible seals have an outer lengthwise dimension, parallel to their longitudinal axis, which is larger than the diameter of the port openings of the valve chamber for effective sealing off of the ports themselves. Cold flow of the seals is compensated for by having the outer edges of the seals beveled or rounded.

---

This invention relates to linear type valves and more particularly to an improved plunger for use in linear type multichamber valves.

Plungers of the type herein referred to include a rod with a plurality of seals axially spaced and affixed to the periphery of the rod. The plunger is mounted within a valve barrel, and the seals are adapted to snugly fit against the wall thereof. The seals thus divide the barrel into a series of movable chambers which can be positioned axially by movement of the plunger within the barrel. Ports are provided in the valve body and extend through the wall of the barrel and into the various chambers. By repositioning the plunger, certain of the ports are caused to alternately communicate with different chambers. Conduits are connected to the ports, and thus, by selectively joining different pairs of ports to a common chamber, the presence and direction of the flow of a fluid through the conduits can be controlled.

Linear type valves are in widespread use and are adapted to perform in many different applications. The fluid may be a gas or it may be a liquid, and the chambers may be subjected to high internal pressure, or they may be subjected to reduced pressure which has been created to draw the gas from a conduit into and through the chamber. Thus the seals have to provide exceptional performance in order to prevent leakage. One example where particularly high performance is required is in the field of gas chromatography. When injecting a small quantity of a sample gas into the chromatographic system, it is desirable to first reduce the pressure within the sample loop and then to allow ambient pressure to force the sample gas into the loop. A linear type valve then connects the loop into the system. The reduction of pressure creates a great pressure differential on the valve seals, and of course, if any leaking occurs, the chromatographic reading will be inaccurate. Furthermore, the seals cannot utilize lubrication which can also cause erroneous readings.

Dry seals, i.e., seals not requiring lubrication, have been developed which are capable of providing the performance required for many applications of the linear type valve. One such type of seals which is well known in the industry is marketed under the trademark "Teflon."

However, the development of such seals has not per se provided the linear type valve with a satisfactory plunger. Prior art linear valves utilizing the improved dry seals are capable of satisfactory performance for a short time, but then, due to frictional sliding, the seals quickly wear down and leaking occurs. The valve must then be replaced or dismantled and rebuilt with new seals. It is therefore an object of the present invention to provide a plunger that incorporates adjustable means whereby the radial dimension of the worn seals can be increased to thus provide a consistently tight seal with the walls of the barrel over a much longer period of use.

Other objects and advantages of the invention will become apparent by reference to the following detailed description and drawings, in which.

Figure 1:
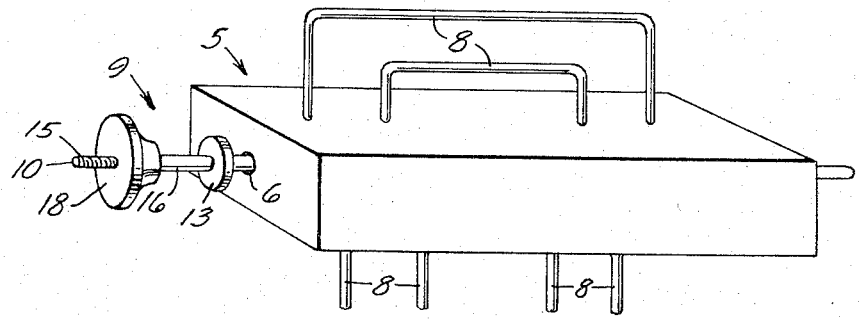
FIGURE 1 is a perspective view illustrating a linear valve of the present invention as incorporated in an instrument such as might be used in a gas chromatographic system.
Figure 2:
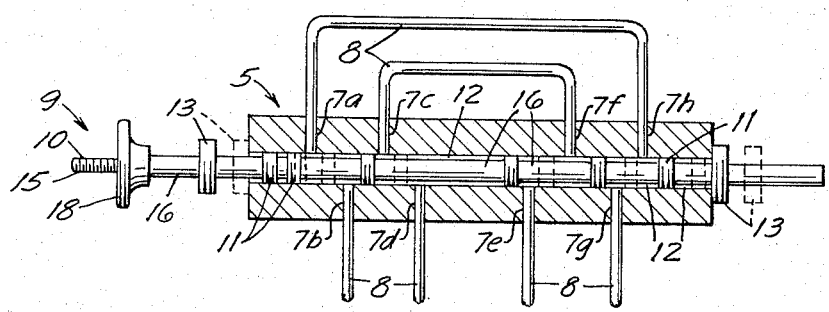
FIGURE 2 illustrates in side elevation and partly in section the linear valve shown in FIGURE 1.

Referring to FIGURES 1 and 2, a valve body 5 is provided with barrel 6 and ports 7a–7h which connect the conduits 8 to the barrel 6. A plunger 9 is mounted within the barrel 6 and comprises a rod 10 having linearly spaced seals 11 affixed to the periphery said seals being tubular in shape and having a length greater than the diameter of the port openings 7a–7h over which the seals pass. The spacings between the seals within the barrel establish movable chambers 12. Adjustable stop members 13 are positioned on the rod adjacent to each end of the valve body to define the limits of axial movement of the plunger. Thus, as viewed in FIGURE 2, the plunger is positioned to the extreme left, and the stop member on the right end of the rod is abutted against the end of the valve body. In this position, ports 7a and 7b are joined, 7c and 7d, 7e and 7f, and 7g and 7h. When the plunger is moved to the right, as shown in dotted lines in FIGURE 2, the stop member 13 on the left end of the rod is abutted against the valve body and the chambers 12 are repositioned so that ports 7b and 7c are joined, 7d and 7e, and 7f and 7g.

Figure 3:
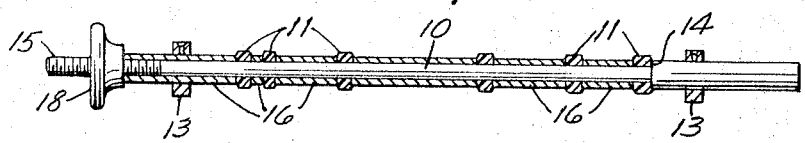
FIGURE 3 is a side view of the plunger illustrated in FIGURES 1 and 2, shown partly in section.
Figure 4:
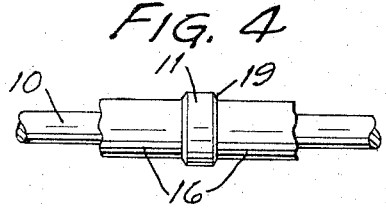
FIGURE 4 is a side elevation view of a segment of the plunger illustrated in FIGURE 3.

Referring now to the specific construction of the plunger 9 illustrated in FIGURE 3, the rod 10 is provided with a shoulder 14 at one end and male screw threads 15 at the other end. Tubular rigid spacers 16 and tubular flexible seals 11 are alternately mounted on the rod. The apertures in said spacers and seals are slightly larger in cross section than the outer diameter of the rod and therefore have slidable free movement on the rod up to the point of said shoulder. A nut 18 is engaged with screw threads 15 and tightened to firmly clamp the seals and spacers between the nut and the shoulder.

It is presumed that the seals are initially of the proper size and will therefore require little adjustment. However, as the plunger is worked back and forth within the valve barrel, the seals will wear and cold flow, and soon the fit between the seals and the wall of the aperture will not be adequate to prevent leakage. As previously mentioned, at this point the prior art valves would have to be reworked. With the present device, however, the nut 18 is further tightened to cause increased clamping pressure which tends to compress the spacers and seals into a tighter pacing between the nut and shoulder. In that the spacers are rigid and the seals flexible, the compression will be borne by the seals. This axial compression or flattening causes the seals to expand radially. The aperture of the seals is occupied by the rod, and, therefore, the expansion must be outward toward the wall of the valve barrel. The expansion compensates for the wearing and cold flow, and total sealing will thus be restored.

It is pointed out that the above adjustment works even if the wearing and cold flow of the seals is not uniform. The seals will expand quite uniformly until certain of the seals are snugly fitted against the barrel wall. The wall will then provide resistance against further expansion of those seals, and the compressive pressure will be passed on to the seals that have not achieved snug fitting. Thus, if adequate clamping pressure is applied, all of the seals, regardless of the extent of wearing and cold flow, will be sufficiently expanded to restore the total sealing thereof. It is also pointed out that as the seals are repeatedly compressed, the effective length of the valve plunger is shortened. Thus, under certain conditions and after a substantial number of such adjustments, it may be necessary to reposition the stop members 13 in order to maintain a proper alignment of the valve seals with the ports. When proper operation of the valve can no longer be achieved by a repositioning of the stop members, then the valve seals may easily be replaced to thereby renew the operative life of the valve.

It will be understood that the present invention is particularly advantageous for those situations where consistently tight sealing is required at all times. Thus, even slight wearing caused by operation of the valve may be enough to require the replacement of the seals in the prior art devices. The time loss of replacing the seals in such situations can become extremely expensive. With the present invention, the operator merely retightens the nut when the seal becomes inadequate and a consistently tight seal can be maintained over a long period of use.

Another feature of the present device is the manner in which the seals are shaped. The peripheral edges 19 of the seals are beveled so that as the plunger is worked back and forth and as the seals are repeatedly adjusted, the cold flow that occurs, i.e., the tendency of the seals to spread at the point of contact with the wall of the barrel, will merely fill in the beveled corners and thus prevent undue spreading beyond the width of the seals. If such precaution were not taken, the cold flow would lap over the ports and thus interfere with and possibly close off the flow of fluid therethrough.

Still another feature of the present device is its ability to properly function under a wide range of temperature conditions. Thus, where a temperature difference sets up expansion and pressure problems which necessitate adjustment in the fitting of the valve seals, such can be easily and quickly accomplished in the manner heretofore described.

Of course it will be understood that the materials used in the construction of the present valve can be varied to suit the particular application that is made thereof. Thus, in circumstances where the use of non-corrosive material is required, such as in the mentioned gas chromatography, the metal valve parts may be constituted of such materials as brass, stainless steel, nickel and Monel, and the flexible sealing members of Kel–F (trademark of 3M Company), neoprene, etc.

What is claimed is:

1. In a linear-type, multichamber valve having port openings of a predetermined diameter, a plunger comprising a cylindrical rod having a shoulder on one end and screw threads on the other ends;

a number of rigid tubular spacers and flexible seals alternately and longitudinally slidably mounted on said rod, said seals being radially expandable upon the application of longitudinally compressive pressure and having outer diameters larger than the outer diameters of said spacers, the edges of said seals being beveled to compensate for cold flow thereof;

said tubular seals having an outer surface extending lengthwise and parallel to the longitudinal axis if said seal wherein the portion of the said lengthwise dimension which contacts the walls of the valve chamber exceeds the diameter of said port openings;

a nut engaged with screw threads on said other end of the rod and cooperative with said shoulder to apply axially directed, compressive pressure to the spacers and seals positioned therebetween, thereby causing the outer diameter of said seals to increase by radial expansion, and effecting a gas-tight sealing between the tubular seals and the walls of the valve chamber.

2. In a linear type valve, a plunger as defined in claim 1 wherein the outer diameter of said spacers is slightly less than the outer diameter of said seals and wherein the outer diameter of said seals is capable of being expanded radially so as to snugly fit into the barrel of said linear valve.

3. In a linear type valve, a plunger as defined in claim 2 wherein the outer edges of the seals are beveled to lessen the spreading effect of cold flow from the seals.

References Cited

UNITED STATES PATENTS

| | | | |
|---|---|---|---|
| 382,003 | 5/1888 | Kirker | 137—625.69 |
| 679,767 | 8/1901 | Mears | 251—324 X |
| 2,409,812 | 10/1946 | Taylor | 251—324 X |
| 3,044,491 | 7/1962 | Sangster | 137—625.18 |
| 3,163,175 | 12/1964 | Pearson | 137—315 |

M. CARY NELSON, *Primary Examiner.*

H. T. KLINKSIEK, *Assistant Examiner.*